Patented Dec. 18, 1951

2,578,748

UNITED STATES PATENT OFFICE 2,578,748

RECOVERY OF METALLIC OXIDES SUCH AS ZIRCONIA

Robert A. Schoenlaub, Cleveland, Ohio, assignor to Sylvester & Company, Cleveland, Ohio, a corporation of Ohio No Drawing. Application March 25, 1946,
Serial No. 657,057

3 Claims. (Cl. 23—16)

The present invention relates to the recovery of zirconia from its ores and minerals. More particularly it relates to a direct process for obtaining the stable form of the oxide. The advantages and novel features will be apparent from the following description.

Zirconia is a potentially useful substance. It has a melting temperature of about 4900° F. and a considerable resistance to slags of widely varying character. Also, it has a high index of refraction and is hard and tough; so that it can be used as opacifiers, pigments, or abrasives. It can also be used as a starting point to form zirconates, titanates, silicates, and the like, which have unusual and useful properties.

Zirconia is not extensively used, although its ores and minerals are plentiful and relatively cheap. The conversion of zirconia materials to the oxide has heretofore been extremely difficult. It has been prepared by volatilizing of silicon in the high temperatures of the arc furnace. Also it has been brought into solution in various ways, such as fusion with caustic alkalies, or carbonates, or with fluorides and subsequent acid dissolution. The impurities have then been separated by complicated and exacting processes involving precipitation, solution, and washing to obtain zirconium sulfates, hydroxides, and the like. These compounds have then required further furnacing at a high temperature to convert them to a refractory grain. Such processes are far too expensive to satisfy the potential industrial needs, and produce an oxide which is physically and thermally unstable.

While my invention as above indicated is concerned with the recovery of zirconia from its ores and minerals, nevertheless, the process comprising my invention will be found applicable to the recovery of amphoteric oxides. By amphoteric oxides as used in this description and in the appended claims, I mean refractory oxides which are less basic than magnesia and less acid than silica.

It is a principal object of my invention to provide a simple process by which zirconia may be obtained directly from minerals.

It is a further object of this invention to provide a process which because of the simplicity and low cost of the materials used may be performed with such yields that the cost of the zirconium oxide produced thereby is much lower than any production costs heretofore available.

Other objects of my invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention comprises the process of separating an amphoteric oxide from a compound of such an oxide which comprises furnacing the material under such conditions as to form a friable silicate whose crystalline structure has pronounced cleavages and an oxide of said metal, comminuting the smelted mass and then separating said oxide therefrom.

It will thus be seen that my invention comprises a simple process by which amphoteric oxides may be obtained directly from their minerals. The process of this invention may be illustrated by having particular reference to the recovery of zirconia.

The process consists of two essential steps: First the zirconia raw material is furnaced in a chemical and physical environment which causes the crystallization of zirconium oxide in discrete grains and in a stable and/or relatively pure form; secondly, the zirconia is separated from the undesirable gangue by a process of comminution and supplementary treatment. The supplementary treatment is preferably by ore dressing techniques such as classification, tabling, flotation, or the like; but it may be chemical dissolution of the waste matter; or it may be by a rougher separation by physical means followed by a simple chemical cleaning operation.

There are several novel features in my invention. Previously zirconium minerals have been furnaced so that the $ZrO_2$ becomes susceptible to chemical solution. I furnace such minerals so that the zirconia becomes refractory to chemical solution. Also, purification was previously a matter of chemical solution and precipitation; whereas I employ mineral dressing techniques. Also, previously the zirconia was obtained in an unstable form; whereas I can obtain it directly in a high temperature stable and granular form. A still further novel feature is that previous processes operate better on relatively pure raw materials; whereas my process works better on comparatively impure materials. Other distinctive features and advantages of my method will be apparent from the following description.

I usually will use zircon as a raw material. The mineral contains about 65% $ZrO_2$ and the remainder is largely silica, which conforms closely with the formula $ZrO_2 \cdot SiO_2$. Some zircon sands will contain ilmenite, rutile and monazite, but such impurities serve a useful fluxing function in my process and need not be removed. I may also use other materials such as impure baddeleyite ($ZrO_2$) or zirkite, which is a mixture of baddeleyite and zircon; but all such I will henceforth refer to as zircon.

The first step in my process is the furnacing of zircon with other substances which preferentially combine with the undesirable matter, thus freeing zirconia. All monovalent, divalent, and trivalent basic oxides such as $K_2O$, $Na_2O$, $BaO$, $SrO$, $CaO$, $MgO$ and $Al_2O_3$, etc., seem to have the power of displacing zirconia from zircon if used in suitable combinations and amounts. However, as the possible systems are extremely complex and refractory, it is most convenient in explaining my invention to give examples of suitable combinations and amounts.

It is perhaps easiest to consider the substances and combinations which may be used from the standpoint of the end products which form. Zirconia will not exist in the presence of acid silicates such as feldspars. It is usually compatible with the common metasilicates, as for example—pyroxenes; intermediate silicates, as for example—melilite; and orthosilicates, such as the olivenes. In extremely basic systems, zirconia will react to form zirconates and in extremely acid systems it forms zirconium silicates and with alkalies it will form alkali zirconium silicates. There are, however, wide ranges of composition through which it can be made to form in the manner desired.

In general the ranges of composition useful with my invention can be defined as compositions of matter which react to form friable silicates such as the metasilicates, melilites, or orthosilicates, or combinations thereof, and zirconia. Alternatively they may be defined as compositions of matter in which the basic functioning oxides and acid functioning oxides are in ratios of between 1:1 and 2:1.

The preferable oxides which I may add to zircon are $CaO$, $MgO$, $Al_2O_3$ or combinations thereof. These will produce displacement of the zirconia according to the following typical reactions:

I. Reaction of basic oxides with zircon to form metasilicate and zirconia:

$2(ZrO_2 \cdot SiO_2)$ plus $CaO$ plus $MgO \rightarrow$
$\qquad CaO \cdot MgO \cdot 2SiO_2$ plus $2ZrO_2$
$ZrO_2 \cdot SiO_2$ plus $MgO \rightarrow MgO \cdot SiO_2$ plus $ZrO_2$ II. Reaction of basic oxides with zircon to form melilites and zirconia:

$2(ZrO_2 \cdot SiO_2)$ plus $2CaO$ plus $MgO \rightarrow$
$\qquad 2CaO \cdot MgO \cdot 2SiO_2$ plus $2(ZrO_2)$
$ZrO_2 \cdot SiO_2$ plus $2CaO$ plus $Al_2O_3 \rightarrow$
$\qquad 2CaO \cdot Al_2O_3 \cdot SiO_2$ plus $ZrO_2$ III. Reaction of basic oxides with zircon to form orthosilicates and zirconia:

$ZrO_2 \cdot SiO_2$ plus $CaO$ plus $MgO \rightarrow$
$\qquad CaO \cdot MgO \cdot SiO_2$ plus $ZrO_2$
$ZrO_2 \cdot SiO_2$ plus $2MgO \rightarrow 2MgO \cdot SiO_2$ plus $ZrO_2$ It must, however, be recognized that these are examplatory and the minerals formed may be more complex than indicated. As examples—pyroxenes may contain ferrous and ferric oxide, sodium oxide, manganese oxide, titania, fluorine, etc. The melilites and orthosilicates similarly are complex. Their nature can best be determined from any standard textbook on mineralogy.

Typical batches and calculated chemical and mineralogical compositions which I may use to obtain the zirconia from zircon are as follows:

| | 1 | 2 | 3 | 4 | 5 | 6 |
|---|---|---|---|---|---|---|
| *Batch* | | | | | | |
| Zircon_____parts__ | 158.2 | 126 | 142.8 | 117 | 113.7 | 62.8 |
| Dolomite_____do__ | 88.0 | 70 | 96.2 | 87.1 | 112 | |
| Limestone_____do__ | | 37.5 | 1.7 | 23.8 | | 75.5 |
| Aluminumdross___do__ | | | | | | 39 |
| *Chemical Composition* | | | | | | |
| CaO_____per cent__ | 12.8 | 22.6 | 15.4 | 21.7 | 19.9 | 29.0 |
| MgO_____do__ | 9.1 | 8.1 | 10.4 | 10.2 | 14.7 | |
| $Al_2O_3$_____do__ | | | | | | 26.4 |
| $SiO_2$_____do__ | 27.2 | 24.3 | 25.9 | 23.8 | 22.9 | 15.6 |
| $ZrO_2$_____do__ | 50.8 | 45.1 | 48.3 | 44.2 | 42.5 | 29.0 |
| *Mineral Composition* | | | | | | |
| Diopside ($CaO \cdot MgO \cdot 2SiO_2$) per cent__ | 49.2 | | 33.8 | | | |
| Akermanite ($2CaO \cdot MgO \cdot 2SiO_2$)_do__ | | 45.1 | 4.3 | 41.3 | | |
| Gehlenite ($2CaO \cdot Al_2O_3 \cdot SiO_2$) per cent__ | | | | | | 71.0 |
| Monticellite ($CaO \cdot MgO \cdot SiO_2$) per cent__ | | | 14.0 | 15.3 | 57.5 | |
| Zirconia ($ZrO_2$)____do__ | 50.8 | 54.9 | 48.0 | 43.6 | 42.5 | 29.0 |

It will be found preferable to adjust the composition by suitable additions so that a major part of the silica reacts to form melilite. Melilite is a continuous series of solid solutions between gehlenite ($2CaO \cdot Al_2O_3 \cdot SiO_2$) and akermanite ($2CaO \cdot MgO \cdot 2SiO_2$), but as mentioned, it also may be very complex in composition. This preference is due to the fact that the melilites are easily fused. They are great scavengers when used in slags, as for example in the blast furnace, and they have a crystal structure and cleavage which facilitates separation. Preferably the remainder of the silica can be combined either as diopside ($CaO \cdot MgO \cdot 2SiO_2$) or clinoenstatite ($MgO \cdot SiO_2$) or both. Batching is not critical, but the impurities should be considered if they are excessive in amount or unusual in character. Relatively pure materials such as baddeleyite may be handled by adding silica to provide the necessary scavenging action and then treating as with zircon.

Composition must be given additional consideration in cases in which it is desired to obtain the unstable form of the oxide, or to obtain the oxide in a purer form than is the usual case. This will be subsequently discussed.

The melting process is quite simple. The raw materials are crushed to —10 mesh, mixed in the desired proportions, and inserted in a suitable furnace. The batch is then fused and finally held at about 2900° F. for about six hours or until the $ZrO_2$ crystals attain a size and uniformity suitable for the separation process. The slag is then poured and allowed to cool. As in other ceramic processes, there is considerable latitude in the furnacing. This can be accomplished at comparatively low temperatures if the time is sufficiently long, or it can be accomplished in short periods of time if the temperature is sufficiently high.

Any reverberatory, electric furnace or similar device, which is capable of reaching the requisite temperatures may be used. The requisite temperatures are above 2600° F. The furnace should have a tipping device and large pouring ports or spouts so that the removal of the viscid $ZrO_2$ containing slag is facilitated. The hearth material which may be used is somewhat dependent on the composition of the melt. In the more acid melts the hearth may be fireclay; in some of them it might be chromite; and with the more basic fusions, it may be magnesite. With all such refractories there will be some corrosion of the hearth, particularly of the slag line and also some undesirable contamination of the slag. A successful practice is to build a fireclay sub-hearth and to fettle this with a zircon-limestone mixture of the same basic oxide to silica ratio as used in the batch.

When thus smelted, the fused slag will comprise spherical particles of $ZrO_2$ in a matrix of crystallized silicate. The size and uniformity of the crystals will depend upon the intensity of firing; high temperatures, and prolonged firing will give better uniformity and size.

The separation of the silicate gangue from the $ZrO_2$ crystals is a simple process, comprising the following steps: Crushing, grinding, classification, and/or flotation, and/or chemical cleaning. The actual details of the processing will depend upon the size and uniformity of the crystals obtained and the degree of separation required. Also, the grinding, classification, etc. may be wet or dry or any combination thereof.

Comminution can be obtained by any conventional crushing and screening system as for example, a primary jaw crusher and an intermediate gyratory crusher operating in a closed circuit with a circulating load. The crushed screened product can then be fed to a rod mill and classifier to produce a product substantially of —70 mesh or otherwise suitable for a ball mill feed.

The final grinding is the only critical part of the process. In this step the fines previously reduced are ground so that the tough spherical $ZrO_2$ grains are freed from the siliceous gangue, without crushing, and the friable silicates are reduced to extremely small sizes. This grinding can be conveniently accomplished in a pebble mill using small pebbles and long grinding periods. After comminution the product will be found to comprise $ZrO_2$ crystals, more or less spherical in shape, and about 30 microns in size, and silicate fines of about 5-10 microns in size.

The simplest means of separating the gangue from the $ZrO_2$ is by classification. Separation by classification is favored by the specific gravity of $ZrO_2$ (about 5.6) and of the silicates (about 3) and by the tabular and acicular shape of the silicates which are subsequently described. It can also be favored by the use of high temperatures in firing so that comparatively large and uniform $ZrO_2$ crystals are obtained and careful grinding so that fine silicate grains are obtained. The classification can be made by the continuous centrifuge with the cut taken at about 15 microns.

Alternatively I may use flotation as a means of separation. It is somewhat difficult to preferentially float $ZrO_2$, but it can be done to some extent by the use of cationic amines. It is usually easier to float off the silicates by fatty acids, their derivatives, such as sodium oleate, or sulfated alcohols. The flotation is preferably done in a thin slurry and the slurry activated with a lead salt. Such a flotation will remove the bulk of the silicates, leaving the $ZrO_2$ grain.

The physical or chemical separation process of the kind described will not give a complete separation. Usually the $ZrO_2$ grains will have from 5 to 10% attached or otherwise associated matter. This can be removed chemically. The contaminated grains are merely added to muriatic acid and digested until the silicates are destroyed. The suspension is diluted with water and washed free from chlorides. The grain will then be associated with tenacious silica gel. This can be removed by adding caustic soda and agitating intensely. The siliceous matter is dispersed by this treatment and may be easily removed by classification. By this process I obtain a physically clean and relatively pure $ZrO_2$.

All of the contaminating silicates may be removed by chemical means. Such means uses larger amounts of reagents and is therefore less desirable than a physical separation combined with a chemical cleaning.

The character and nature of the mineral species has a bearing on the efficiency of the process and quality of the product. $ZrO_2$ in the pure form exists in several polymorphous modifications, somewhat like silica and titania. The natural form, baddeleyite is monoclinic. At a temperature of about 1800° F. it inverts to a tetragonal form with a marked contraction in volume. This inversion is reversible and the volumetric instability so caused prevents the use of the oxide in formed refractory shapes. A stable cubic form can be made by the absorption by solid solution of the oxides of calcium, magnesium, scandium, yttrium and cerium, as well as beryllium and others in amounts of 2 or more percent. In the practice described, the stable form is usually obtained.

If zirconia for chemical purposes or the unstable form is otherwise desired, it can be made by a modification of this process. The easiest way to accomplish this is by adjusting the slag composition so that the silicates are of the acid or metasilicate type; for instance, for each two molar equivalent of silica, a molar equivalent of dolomite should be added and the silica removed as diopside. Another way of making the unstable oxide is by use of oxides which have no stabilizing effect, to form the silicates. Conversely on occasions I may add stabilizing oxides or minerals to the slag for the purpose of improving the stability.

The operability of the process depends largely upon the pronounced cleavages possessed by the silicates. The pyroxenes have a prismatic cleavage (110) which gives acicular fragments. The orthosilicates have pinacoidal cleavages (010, 001) which give blocky rectangular grains. Melilites are tetragonal with an extremely pronounced basal cleavage which gives mica-like fragments. As $ZrO_2$ has no observable cleavage and occurs in spherical grains, attrition in the mill will roll the grain and shear it free from the friable silicates. The separation is quite easy with melilites, less easy with pyroxene, and somewhat more difficult with the orthosilicates. Chemical separation is easiest with the orthosilicates, less so with the melilites, and most difficult with the pyroxenes. However, in no case does the chemical stability of the silicates approach that of the zirconia.

As previously indicated, this invention is applicable to other oxides. In general, it may be used for the extraction of any amphoteric refractory oxide which is in equilibrium with a silicate melt in which the ratio of basic functioning oxides to acid functioning oxides as from 1:1 to 2:1. In some instances the operation of this invention will require the addition of basic oxides; in others, acidic oxides such as silica; and in still others, both acidic and basic oxides. Particularly my invention applies to the extraction of beryllium oxides from beryl; thorium oxide from its silicates; and chromium oxide from chromite.

The following is a typical batch as one example of my invention:

| | Parts |
|---|---|
| Limestone (10 mesh) | 16.25 |
| Calcined magnesite (10 mesh) | 3.75 |
| Zircon (sand) | 27.5 |
| | 47.5 |

This mixture was fired in an electric furnace at 3200° F. for 2 hours. It was slowly cooled and crushed to −10 mesh. It was then ball milled with flint pebbles until the silicates were reduced to a fine powder and the $ZrO_2$ reduced to discrete grains, but not crushed. I then separated and discarded the −10 micron material by mechanical classification.

The residue was then treated with muriatic acid until all silicates were destroyed. All of chlorides were then washed out. The residue was then treated with a NaOH solution and agitated until the siliceous gels were dispersed from the zirconia grain. I then separated the gels and the grain by again classifying. Final washing and de-watering gave $ZrO_2$ sand.

From the description previously given of the general process, those skilled in the art, by following the procedure outlined above in the representative example, will be able to carry on the process with such modifications as are required for particular materials.

Other modes of applying the principle of the invention may be employed, change being made as regards the details described, provided the features stated in any of the following claims or the equivalent of such be employed.

I therefore particularly point out and distinctly claim as my invention:

1. A process for recovering zirconium in the form of zirconium oxide from a substance containing a silicious compound of the metal which comprises forming a heterogeneous system of discrete crystals of zirconium oxide and a crystalline silicate gangue substantially free of such oxide by heating and reacting said material at a temperature below about 3200° F. with an added basic material in such an amount that the basic functioning oxides and acid functioning oxides are present in ratios of between 1:1 and 2:1 and which basic material is of such type that upon reaction with silica in the stated proportions will produce preponderantly soluble ortho-silicates thus setting free the zirconium oxide as such in crystal grains and forming a friable silicate gangue, and after disintegrating the mass, separating the ortho-silicate thus formed from the zirconium oxide grains.

2. A process in accordance with claim 1 characterized further in that said added basic material contains a substantial proportion of calcium oxide.

3. A process in accordance with claim 1 in which said added basic material contains a substantial proportion of magnesium oxide.

ROBERT A. SCHOENLAUB.

REFERENCES CITED

The following references are of record in the file of this patent:

UNITED STATES PATENTS

| Number | Name | Date |
|---|---|---|
| 1,340,888 | Gordon | May 25, 1920 |
| 2,076,080 | George et al. | Apr. 6, 1937 |
| 2,084,630 | Deguide | June 22, 1937 |

OTHER REFERENCES

Floatation and Agglomerate Concentration of Non-Metallic Minerals, Bureau of Mines Report of Investigations, May 1938, pages 19 and 20.